Figure 1:
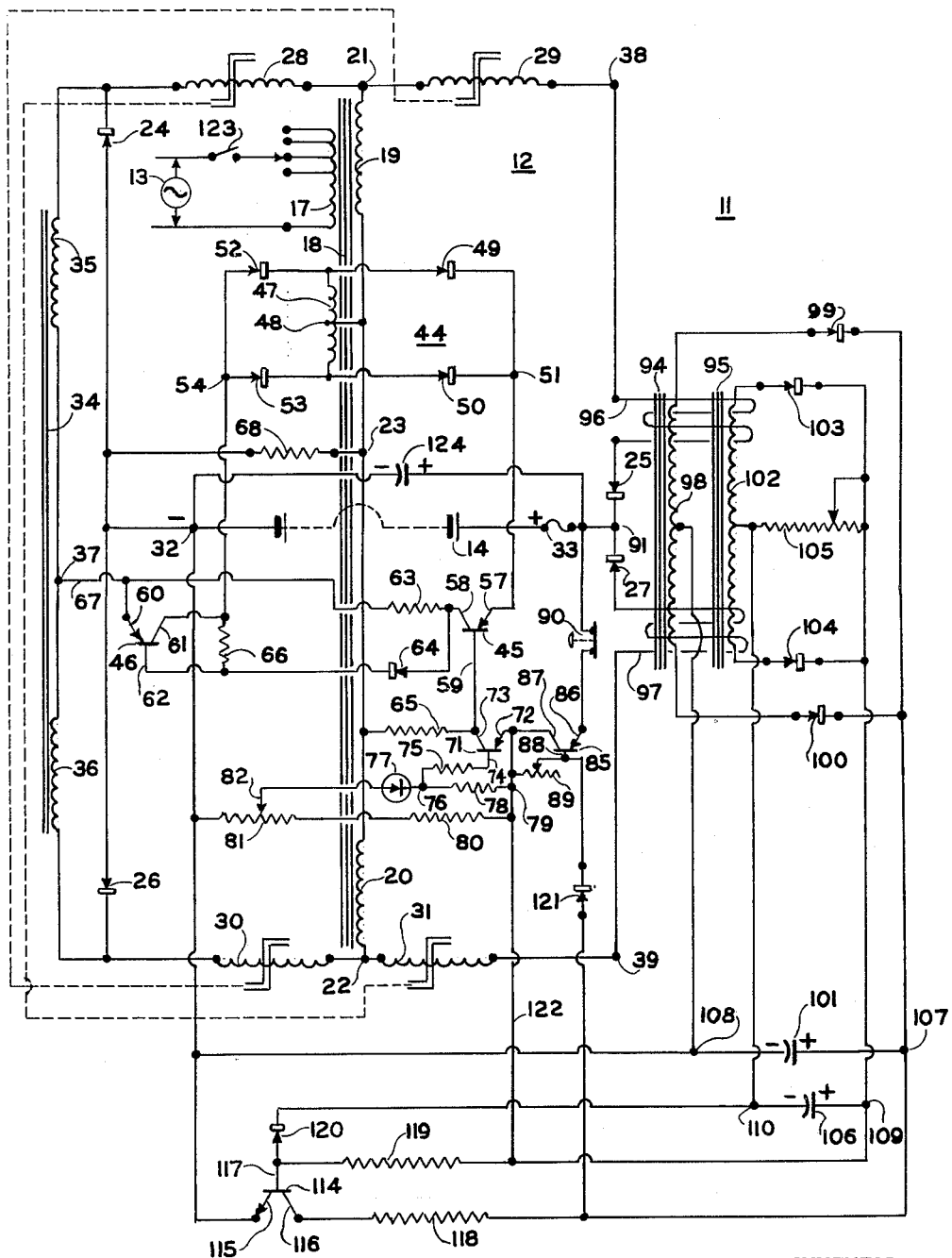

Sept. 11, 1962     E. E. MOYER     3,054,040
ELECTRICAL CIRCUIT

Filed May 22, 1959     2 Sheets—Sheet 1

INVENTOR.
ELMO E. MOYER
BY Woodling and Kroot,
attys.

Sept. 11, 1962     E. E. MOYER     3,054,040
ELECTRICAL CIRCUIT

Filed May 22, 1959     2 Sheets—Sheet 2

INVENTOR.
ELMO E. MOYER
BY
Woodling and Kroot,
attys.

United States Patent Office

3,054,040
Patented Sept. 11, 1962

3,054,040
ELECTRICAL CIRCUIT
Elmo E. Moyer, Cuba, N.Y., assignor to Acme Electric Corporation, Cuba, N.Y., a corporation of New York
Filed May 22, 1959, Ser. No. 815,050
29 Claims. (Cl. 321—19)

The invention relates in general to controllable electrical circuits controllable by an electrical condition such as current or voltage and operable from a voltage input and supplying a regulated load, and more specifically to a regulatable rectifier circuit which has voltage regulation plus a current limit regulation for load voltages below a predetermined value and additionally, a predetermined high level of voltage at which the rectifier circuit returns to control in accordance with the voltage regulation.

The electrical circuit of the present invention may be used with many forms of loads, but one primary example is as a regulatable rectifier circuit used as a battery charger for storage batteries wherein it is desirable to maintain the battery voltage at a predetermined float level which requires a very small input current to the battery, and when the battery charger is connected to a discharged battery which has a lower terminal voltage the rectifier circuit supplies increased current controlled by a current limit signal, so that the battery is charged essentially at a constant current until a predetermined high level of terminal voltage is reached, whereat the rectifier circuit automatically reverts from current limit control to voltage regulation control to maintain the battery charged at a predetermined float level.

The prior art has known different forms of regulatable rectifier circuits including those used for battery chargers but the ordinary voltage and current regulator for battery chargers tends to maintain a predetermined maximum voltage regardless of the charge condition of the battery and this in turn causes a tapering charge starting at high levels of current and tapering to small values of current, yet even these small values of current will maintain a fully charged battery at so high a voltage level that the storage battery gasses considerably which overheats the battery and causes premature end of life.

Accordingly, an object of the invention is to provide a regulatable rectifier which may be used as a battery charger to maintain substantially constant charging current to the battery.

Another object of the invention is to provide a regulatable rectifier circuit normally set at a predetermined low terminal voltage and voltage regulated at that value and which voltage regulation control may be overridden by a current control.

Another object of the invention is to provide a regulatable rectifier for a D.C. load to maintain a predetermined low level of output voltage which may be overridden by a current control and which in turn may be overridden by the voltage regulation when a predetermined high value of output voltage is reached.

Another object of the invention is to provide a voltage regulated rectifier circuit which has a current limit control which control predominates upon the output voltage being less than a predetermined value and which current limit control maintains substantially constant output current to a load until the load voltage reaches a predetermined high level at which a storage battery load may gas, and then the voltage regulation control again overrides the current limit control and returns the load voltage to a predetermined low level to maintain the battery load at a float charge level.

Another object of the invention is to provide a regulatable bridge rectifier circuit with magnetic amplifier control, in turn controlled by transistors to control the impedance of the magnetic amplifier and hence to regulate the output of the bridge rectifier circuit.

Still another object of the invention is to provide in a bridge rectifier circuit first and second transistors connected in opposition to control oppositely the impedance of magnetic amplifiers connected in the bridge rectifier circuit.

Yet another object of the invention is to provide first and second opposedly acting transistors, one turning on the control and one turning off the control, with the first transistor tending to bias off the second and a third transistor oppositely affecting the first transistor.

Still another object of the invention is to provide a current limit signal which is immediately effective upon the current reaching a predetermined value to control a voltage regulated circuit and with the current drain caused by the current limit signal being supplied by a current control signal to eliminate adverse effects of drain on the current limit signal.

Still another object of the invention is to provide a voltage regulated circuit wherein a voltage in accordance with the load voltage is compared with a voltage in accordance with the load current and the greater of these two voltages is used to control the regulatable circuit.

Figure 2:
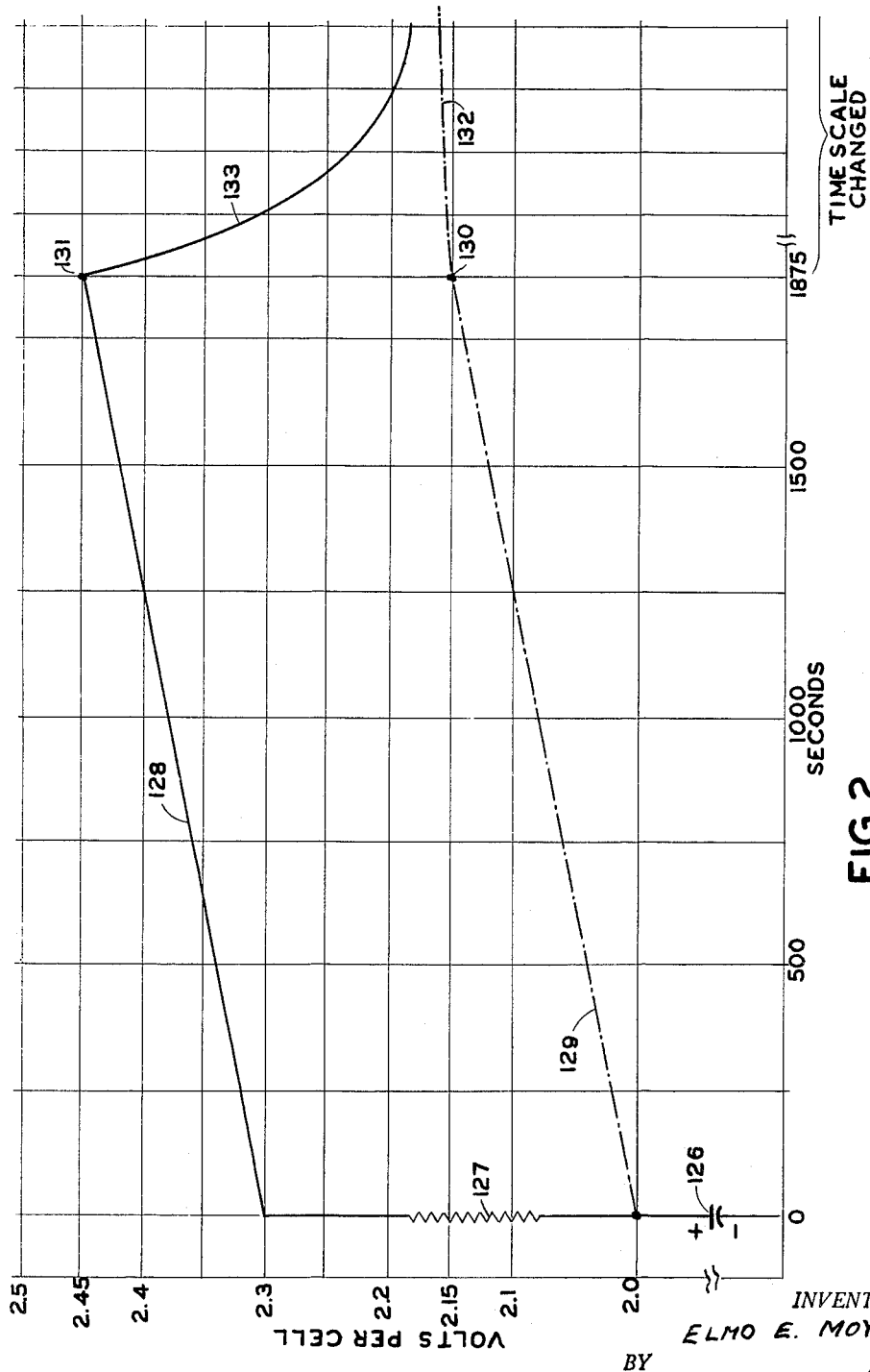

Other objects and a fuller understanding of this invention may be had by referring to the following description and claims, taken in conjunction with the accompanying drawings, in which:

FIGURE 1 is a schematic diagram of a regulatable circuit embodying the invention; and FIGURE 2 is a graph of voltage versus time of the output voltage of the rectifier circuit.

FIGURE 1 shows an electrical circuit or regulatable rectifier circuit 11 which includes generally a bridge rectifier 12 operable from an alternating voltage input 13 and supplying variable direct current to a D.C. load 14. The A.C. input 13 is connected to the primary 17 of an input transformer 18 which has secondary windings 19 and 20. The two secondaries have end terminals 21 and 22 which may be considered the alternating voltage input terminals of the bridge rectifier 12. The junction 23 of the secondaries 19 and 20 may be considered a midtap or neutral point of the alternating voltage input.

The bridge rectifier 12 includes generally first, second, third and fourth rectifiers 24, 25, 26, and 27, respectively, and includes first, second, third and fourth magnetic amplifier windings 28, 29, 30 and 31, respectively. The first input terminal 21 is connected between the first and second rectifiers 24 and 25 and the second input terminal 22 is connected between the third and fourth rectifiers 26 and 27. The first and fourth magnetic amplifier windings 28 and 31 are mounted on a common core and the second and third magnetic amplifier windings 29 and 30 are mounted on another common core, and each pair is polarized to be flux additive. The rectifier circuit 11 has first and second D.C. output terminals 32 and 33 to which the load 14 is connected. The load 14 has been shown in this case as a chargeable battery although this is merely illustrative of one form of load. The bridge rectifier 12 establishes first and second alternative paths for alternating current between the input terminals 21 and 22 and the output terminals 32 and 33. The first path includes the first and fourth rectifiers 24 and 27 and also includes the first and fourth magnetic amplifier windings 28 and 31. The second path includes the second and third rectifiers 25 and 26 and the second and third magnetic amplifier windings 29 and 30. A control transformer 34 has first and second windings 35 and 36 with the junction 37 therebetween establishing a neutral voltage point relative to the first and third magnetic amplifier windings 28 and 30.

The regulatable rectifier circuit 11 supplies an adjustable voltage to the output terminals 32 and 33 and this voltage is varied in accordance with impedance of the magnetic amplifier windings, and in this particular circuit is governed in accordance with the impedance of the magnetic amplifier windings 28 and 30. The control transformer 34 may be connected as shown or could be connected across terminals 38 and 39 with a reversal of control sense, which would also establish another neutral voltage point with respect to the magnetic amplifier windings.

The rectifier circuit 11 includes a D.C. voltage source 44 and first and second power transistors 45 and 46. The transistors 45 and 46 are of the PNP type or P type in this example. The D.C. voltage source 44 includes a secondary 47 on the transformer 18 and which has a midtap 48 connected to the alternating voltage neutral 23. The D.C. voltage source 44 includes rectifiers 49 and 50 connected across the secondary 47 to establish a positive D.C. terminal 51 relative to the midtap 48. Also, rectifiers 52 and 53 are connected across the secondary 47 to establish a negative terminal 54 relative to the midtap 48.

The transistor 45 has emitter, collector, and base electrodes 57, 58 and 59, respectively, and the transistor 46 has emitter, collector, and base electrodes 60, 61 and 62, respectively. The emitter electrode 57 is connected to the positive terminal 51 of the D.C. voltage source 44 and the collector 61 is connected to the negative terminal 54. A feedback resistor 63 connects the collector 58 and the emitter 60 and a silicon diode 64 conducts current from the collector 58 to the base 62. The base 59 is connected through a first biasing resistor 65 to the alternating voltage neutral 23 and a second biasing resistor 66 connects the collector 61 and base 62. A lead 67 interconnects the magnetic amplifier neutral 37 and the emitter 60. A bleeder resistor 68 interconnects the first D.C. output terminal 32 and the alternating voltage neutral 23 to establish a determinable voltage therebetween. The first transistor 45 and the D.C. voltage source 44 are connected to conduct current from the alternating voltage input neutral 23 to the magnetic amplifier neutral 37, and conversely, the second transistor 46 and the D.C. source 44 are connected to conduct current from the magnetic amplifier neutral 37 to the alternating voltage input neutral 23. In each case the return path for the aforementioned currents is through the magnetic amplifier windings 28 and 30. In the case of current conducted by the first transistor 45 the current flow through the magnetic amplifier windings 28 and 30 is to the right, in the diagram of FIGURE 1, which is in the same direction as load current flow hence this transistor current turns on the regulatable rectifier 11 to increase the output thereof. In the case of current through the second transistor 46, the flow of current through the magnetic amplifier windings 28 and 30 is in a reset direction, that is, it is in a direction opposite to the flow of load current to reset the magnetic amplifiers to increase the impedance thereof and hence is in a direction to turn off the regulatable rectifier circuit 11. Since windings 28 and 31 are on a common core and windings 29 and 30 are on another common core, the impedance of all windings increases or decreases in accordance with the change on the windings 28 and 30.

A third amplifying transistor 71 has emitter, collector, and base electrodes 72, 73 and 74, respectively, and is of the PNP or P type. The collector 73 is connected to the base 59 and the base 74 is connected through a resistor 75 to a terminal 76. This terminal 76 is the junction between a zener diode 77 and a resistor 78 with the other end of the resistor 78 connected to a terminal 79. A resistor 80 and potentiometer 81 are connected in series between the terminal 79 and the first D.C. output terminal 32. A movable blade 82 on the potentiometer 81 is connected to the other terminal of the zener diode 77. The emitter 72 is connected to the terminal 79.

A fourth PNP or P type transistor 85 has emitter, collector, and base electrodes 86, 87, 88, respectively, with the collector 87 connected to the terminal 79 and the base 88 connected through a rheostat 89 to this terminal 79. The emitter 86 is connected through a test switch 90 to the junction 91 between the rectifiers 25 and 26, which junction is connected through a fuse to the second D.C. output terminal 33.

First and second current transformers 94 and 95 are provided, and first and second primaries 96 and 97 link both of these transformers 94 and 95. The first primary 96 is in series with rectifier 25 and the second transformer 97 is in series with the rectifier 27 so that these current transformers are responsive to the total load current. The first current transformer 94 has a secondary 98 which acts through rectifiers 99 and 100 and develops a current control signal across a filter capacitor 101. The second current transformer 95 has a secondary 102 and acts through rectifiers 103 and 104 to develop a unidirectional current limit signal across a potentiometer 105. A capacitor 106 is connected in parallel with this potentiometer 105 for filtering this unidirectional voltage.

The capacitor 101 has positive and negative terminals 107 and 108, respectively, and the capacitor 106 has positive and negative terminals 109 and 110, respectively. A fifth transistor 114 is of the NPN or N type and has emitter, collector, and base electrodes 115, 116 and 117, respectively. The emitter 115 is connected to the first D.C. output terminal 32 and the collector 116 is connected through a resistor 118 to the positive terminal 107 of the current control signal 101. The base 117 is connected through a resistor 119 to the positive terminal 109 of the current limit signal 105. A diode rectifier 120 is connected to conduct current from the base 117 to the negative terminal 110 of the current limit signal 105. A rectifier 121 is connected to conduct current from the positive terminal 107 of the current control signal to the base 88 of the transistor 85, and a lead 122 connects the positive terminal 109 of the current limit signal to the terminal 79.

*Operation*

When a switch 123 is closed the rectifier circuit 11 is energized to provide a regulatable unidirectional voltage across the output terminals 32 and 33. This may be for a battery charger as one use thereof and a capacitor 124 may be connected across the output terminals so that when the battery 14 is not connected to the output terminals the rectifier circuit 11 still may be operated to preset the controls.

The movable blade 82 of the potentiometer 81 is that which adjusts the battery voltage, especially at a predetermined low level which will maintain a voltage sufficient to supply a very small charging current to the battery 14 for a float level. This is the primary adjustment, one for voltage regulation.

The potentiometer 105 is adjustable to adjust the current limit signal and adjusts the rate at which the rectifier circuit 11 will charge the battery 14 at a constant current. This current limit adjustment presets a maximum continuous average-value of current output from the rectifier circuit 11 when the load voltage is less than the value preset by the voltage control 81.

The rheostat 89 may be called a gasser voltage adjustment and it presets the ceiling voltage or predetermined maximum value of load voltage to which the battery will be charged under constant current conditions at the current limit value before the current is allowed to drop back to the float current value at the lower value of voltage preset by the voltage adjustment 82.

FIGURE 2 shows a graph of volts versus time for charge conditions of a battery such as the battery 14. Any storage battery may be represented in an equivalent circuit by a resistance and a capacitance in series with the resistance representing the internal resistance of the battery and the capacitance or capacitive reactance representing the characteristics of the battery which make it exhibit a transient circuit behaviour when either a voltage is applied or current is drawn from the battery. In FIGURE 2 the capacitance 126 and resistance 127 are shown diagrammatically to illustrate these two series circuit elements which make up the equivalent circuit of a storage battery. If one assumes that the volts per cell of the storage battery is about two volts under open circuit conditions for a discharged or practically fully discharged battery, then the voltage rise across the cell will be represented only by that voltage across the capacitance 126. If the internal resistance of the battery is assumed to be constant during charging, and a voltage of 2.3 volts per cell is applied to the terminals of the battery, then the battery will start to charge and the additional .3 volt will be absorbed in the internal resistance 127. The straight line curve 128 will represent the rate at which the terminal voltage of the battery will rise under a constant current condition and this is because this curve 128 must remain parallel to a curve 129 which is the rate of rise of the counter E.M.F. of the battery; namely, the voltage across the capacitance 126. The curve 129 is a straight line curve to a point 130, in this case shown as 2.15 volts per cell, as the predetermined low level of voltage at which the voltage control 82 has been preset. Since the internal resistance of the battery has been assumed to be constant, and this is generally true in practice, the point 131 on the curve 128 will be .3 of a volt higher than the point 130 and this value of 2.45 volts per cell is the voltage at which the gasser voltage adjustment 89 has been set; namely, the predetermined maximum value of voltage.

It has previously been stated that the rectifier circuit 11 is capable of voltage regulating the D.C. output at terminals 32 and 33 at a predetermined low level represented by curve 132, in this case shown to be of about 2.15 volts per cell, which is a float charge level of the battery 14 and is the ordinary condition when the battery is fully charged and merely floated across the line. Under conditions of a discharged battery being connected across the output terminals, the circuit 11 as hereinafter shown causes the current limit signal to take control and this charges the battery at a constant current with the circuit output voltage being represented by the curve 128 to charge the battery at a constant rate until a point 131 is reached, whereat the gasser voltage adjustment takes over and momentarily shuts off the rectifier circuit until the terminal voltage of the battery drops along a hyperbolic curve 133 to asymptotically approach the curve 132. This assures that the battery 14 will be charged at the maximum capabilities of the rectifier circuit 11 through the charging period, which may be ten hours for example, and the amount of gassing which the battery does is held to a minimum to avoid overheating the battery and shortening the life thereof, yet when the battery has reached full charge, as indicated by the point 131, then the charge rate is very materially and rapidly reduced to a low level of float charge.

The regulated rectifier circuit 11 is primarily one controlled by voltage, but several voltages are compared and one or another may predominate at different stages of the charging of the battery. Basically, a voltage regulating circuit is used in accordance with a control voltage as determined by the voltage across the terminal 32 and 79. The potentiometer 81 is connected across this control voltage to provide the necessary adjustment thereof.

The alternating current input may be considered to be across the terminals 21 and 22 with the circuit supplying a unidirectional voltage to the terminals 32 and 33, and with the polarity of the rectifiers 24—27 as shown the terminal 33 will be positive. As previously stated, when the transistor 45 conducts current from the voltage source 44, this current flows through the lead 67 and through the magnetic amplifier windings 28 and 30 to the right to return to the midtap 48. When the transistor 46 is conducting current from the voltage source 44 this current flows through collector 61, terminal 54, either rectifiers 52 or 53 depending upon the instantaneous polarity, the midtap 48, the secondaries 19 and 20, the magnetic amplifier windings 28 and 30 to the left and then through the control transformer 34 to the transistor 46. This current flow is to the left in magnetic amplifier windings 28 and 30 hence it is in a reset direction to increase the impedance of all the magnetic amplifier windings and hence to reduce the output of the rectifier circuit 11. Essentially then the control of the rectifier circuit 11 is effected by controlling the relative conduction of the transistors 45 and 46 which have opposite effects on the rectifier circuit 11. The transistor 45 when it is conducting makes the feedback resistor 63 supply a bias to the emitter 60 which will be negative relative to the positive potential applied through the diode 64 to the base 62. Thus the more transistor 45 conducts the more the transistor 46 is biased off. The diode 64 should preferably have the characteristics of a silicon diode, namely that it has approximately a .5 volt drop in the conducting direction with insignificant amounts of current which acts as a biasing E.M.F.

The third transistor 71 may be considered an amplifying transistor to control the relative conductives of transistors 45 and 46. When transistor 71 conducts current flows to the left in the biasing resistor 65 which biases the base 59 of the transistor 45 more positively, hence turns off this transistor 45. Thus increased conduction of the third transistor 71 causes decreased conduction of the first transistor 45 which decreased conduction has less biasing off effect on the second transistor 46, and since this second transistor 46 is a self-biased transistor by the second biasing resistor 66, there is increased conduction through the second transistor 46. Thus increased conduction through the third transistor 71 results in increased conduction through the second transistor 46 which is in the direction to turn off the rectifier circuit 11.

The zener diode 77 and the resistor 78 are connected across most of the control voltage which is across the terminals 32 and 79, and is connected to the movable blade 82 for adjustment purposes. The zener diode has a character of substantially constant voltage, hence acts as a reference voltage source. If the potential on terminal 79 tends to increase relative to the negative terminal 32, this causes the emitter 72 to become relatively more positive whereas the base 74 relatively stays at the same potential since it is connected to the reference voltage source of the zener diode 77. Making the emitter 72 more positive thus turns on the transistor 71 to turn on the transistor 46 and thus turn off the rectifier circuit 11 to lower the voltage to the output terminals 32 and 33.

The fourth transistor 85 is a self-biased transistor by means of the rheostat 89 and the impedance in the forward direction from the terminal 91 through the emitter 86 to the base 88 is quite low, in order of .1 of a volt. Also, a change in value of the rheostat 89 does not materially affect the current flow through the emitter 86 and collector 87. Also, since this fourth transistor 85 is connected in a self-biasing arrangement the forward impedance from the emitter 86 to collector 87 is relatively low, again in the order of .1 of a volt and; hence, the transistor 85 may be considered as a unidirectional conducting means to conduct current from the terminal 91, which is effectively the terminal 33, to the positive terminal 79 of the control voltage. The aforementioned elements constitute the basic circuit for the voltage regulating arrangement, since as the load voltage tends to increase for any reason, this higher positive potential will be passed by transistor 85 to the terminal 79 and this increased voltage will turn on the transistor 71; hence, turn on the transistor 46, which passes more reset current through the magnetic amplifiers and thus increases the impedance thereof to lower the output of the rectifier circuit 11. Conversely, if the load voltage is lowered for any reason this lower positive potential at terminal 33 would be passed to the positive control voltage terminal 79 which would decrease the conduction of transistor 71, decrease the positive bias on base 59 and increase the conduction of the transistor 45 to turn on the magnetic amplifiers and; hence, turn on the rectifier circuit 11. At the same time this increased current through transistor 45 increasingly biases off the transistor 46 by the bias supplied by the feedback resistor 63. The above is the voltage regulator portion of the circuit with the movable blade 82 being the control of the low voltage at which a fully charged battery may be floated across the terminals 32 and 33.

When a discharged battery is connected across the terminals 32 and 33, the open circuit terminal voltage of the battery will be lower than the open circuit voltage of a fully charged battery and; hence, lower than the value at which the voltage adjustment 82 has been preset. Accordingly, the rectifier circuit 11 will respond to this lower voltage and attempt to raise the voltage by increasing the output of the rectifier circuit 11. As the load current increases, the current transformers 94 and 95 get increasing current to increase both the current limit signal 106 and the current control signal 101. The current limit adjustment at the potentiometer 105 is preferably preset at a maximum safe value for the output of the rectifier circuit 11 and this may be any value in accordance with the wattage rating of the various components, but for example, it might be ten amperes in the load 14. The current transformers 94 and 95 in this case are identical, but they need not be, and the current limit signal across the capacitor 106 will rise as the load current increases. This may be preset at any particular value dependent upon the turns ratio of the transformers 94 and 95, but, for example, let it be asumed that the current limit value is set at a value of 12.8 volts across the capacitor 106. This might be a typical value for a battery charger 11 set to charge a six cell storage battery of nominal 12 volts terminal voltage. It will be noted that resistor 119 plus the base 117 and emitter 115 of transistor 114 are connected as a shunt circuit or bleeder for the control voltage appearing across terminals 32 and 79. This flow of current normally turns full on the transistor 114 and let it be assumed that the voltage drop across resistor 119 is 12.7 volts with a .1 volt drop across the base-emitter electrodes of the transistor 114. This is a total of 12.8 volts for the control voltage across the terminals 32 and 79 in this example. As the load current increases then the current control signal across capacitor 101 and the current limit signal across capacitor 106 both increase. If the resistance of rheostat 89 is set at 165 ohms, and the impedance across the terminals 32 and 79 for the normal control voltage is such as to draw 11 milliamperes, then there would be about 1.8 volts drop across the rheostat 89. Since the conrtol voltage across terminals 32 and 79 stabilizes at 12.8 volts in the example chosen, the voltage across resistor 119 will be 12.7 volts, with a .1 volt drop across the base-emitter electrodes of transistor 114. Since the emitter 86-collector 87 voltage drop is about .1 volt, this means that the potential of terminal 91 will be 1.9 volts relative to the terminal 32. This would be the 2.15 volts per cell float value as shown in FIGURE 2. Let it be assumed that potentiometer 105 is set at 80% of the maximum resistance so that the voltage across capacitor 101 will be about 10% less than the voltage across capacitor 106 since it has been asumed that the primary-to-secondary current ratios of transformers 94 and 95 are identical, and the rectified voltages produced are proportional to the values of the respective load resistors $R_{105}$ and ($R_{18}$+Resistance emitter to collector of transistor 114). This setting of potentiometer 105 will result in a particular current limit value. As an example, let it be assumed that two amperes of load current develops 12.8 volts across capacitor 106, therefore as the load current approaches two amperes the voltage across capacitor 106 approaches 12.8 volts and the diode 120 begins to conduct as the capacitor 106 reaches 12.8 volts, since it now has a higher voltage than that appearing across resistor 119. The conduction of diode 120 raises the voltage across resistor 119 to 12.8 volts and this shuts off the transistor 114 since the base 117 has been made more negative. This shutting off of the transistor 114 raises the impedance across the emitter 115 and collector 116 hence raises the potential at the right hand end of the resistor 118, because the total resistance of resistor 118 and transistor 114 is increased. This voltage quickly rises and therefore, the potential of terminal 107 rises to a value in excess of 13.6 volts. At this point diode 121 begins to conduct since the potential of point 107 now exceeds the potential of base 88. This conduction of diode 121 means that the current limit control function takes over rather than the formerly predominating voltage regulation. Previously, transistor 114 had been turned full on and therefore the voltage drop across resistor 118 was not as high as 13.6 volts. The fairly low impedance of the combination of resistor 118 and transistor 114 partially loaded down the current control voltage source across capacitor 101. Now the considerably higher impedance of transistor 114 and the quickly rising potential of terminal 107, incidental to the shutting off of transistor 114, quickly provides a source of voltage, in this case from the current control signal 101, which can easily supply the 11 milliamperes current through diode 121 which is needed between the base 88 of transistor 85 and terminal 32. This 11 milliamperes of current provides the 1.8 volts drop across the rheostat 89 and maintains the 12.8 volts control voltage across terminals 32 and 79. Under these conditions the battery voltage across the output terminals 32 and 33 need never rise to 12.9, in fact, it can drop off to any value and now the rectifier circuit 11 is controlled by the current limit signal.

If the potentiometer 105 is adjusted to a lower value of resistance, then a lower voltage is developed across capacitor 106. This means that a higher load current than the two amperes previously given as an example must be furnished by the rectifier circuit 11 before the current limiting function will be initiated.

The use of two current transformers 94 and 95 separates the current limit signal from the current controlling or current supplying function. In this case the transformer 95 is used merely to preset the value at which the current limiting function shall take over control from the voltage regulating part of the rectifier circuit 11. Current transformer 94 is used as a current control source to supply the needed current through diode 121 to the base 88 of transistor 85. Both of these current limiting and current control functions can be incorporated in a single current transformer such as current transformer 94; however, the advantages of the present circuit will not be obtained. If current transformer 95 were omitted and only current transformer 94 used, the capacitor 106, diode 120, resistor 119 and transistor 114 would be omitted with a direct connection of resistor 118 across terminal 32 and the diode 121. Resistor 118 would be made variable in this case to provide the current limit adjustment. In such case, there might be some normal current, such as 20 milliamperes, flowing through resistor 118 at which the voltage at terminal 107 would reach 13.6 volts. This value of 13.6 volts would start to take over from the voltage regulating function but the attempted bleed off of current through diode 121 would reduce the voltage on the resistor 118. This would mean that the total current supplied from terminal 107 would have to rise to 31 milliamperes, corresponding to 3.1 amperes of load current; namely, 20 milliamperes through resistor 118 and 11 amperes through diode 121, before complete control of the circuit 11 was obtained by current control rather than voltage regulation. By separating the current limit control and the supply of current necessary to take over current limit function, such as by the two transformers 94 and 95, the current limit function may take over control from the voltage regulation control with an imperceptible change in the load current value. This is because as soon as the selected current limit value exceeds the control voltage at terminals 32 and 79, then the diode 120 conducts to shut off transistor 114 and quickly raise the potential at terminal 107. Thus the required current, such as 11 milliamperes, may quickly be bled off through diode 121 since the effective impedance of the transistor 114 and resistor 118 has been raised to provide for the equivalent resistance of the shunting path through diode 121.

With the current limit circuit in control of the rectifier circuit 11, this means that the battery or other load will be charged at a constant current, the current will be maintained constant because if it tends to increase for any reason this will tend to increase the potential of point 109 so that diode 120 conducts more current shutting off transistor 114 still further to lower the potential of terminal 107 and of terminal 79. This makes emitter 72 more positive increasing conduction of transistor 71 and; hence, of the transistor 46 to shut off the magnetic amplifiers and decrease the output of rectifier circuit 11. Conversely, if the current decreases for any reason, the opposite effect takes place and the regulating function establishes that the rectifier circuit turns on increasingly to raise the current to the prescribed value.

The output voltage across terminals 32 and 33 will rise, as shown in FIGURE 2, along the curve 128 in order to maintain a constant current into the battery load despite the fact that the terminal voltage of the battery is increasing. This increasing terminal voltage of the battery appears at terminal 33 and; hence, at the terminal 91 which is connected to the emitter 86. During the constant current charging period of the rectifier circuit 11 there is no current flow through the test switch 90, because the potential of terminal 91 is less than the potential of terminal 107. However, whenever the battery has become charged, the preset maximum value will be reached at point 131, FIGURE 2. This is the value as set by rheostat 89. In the foregoing example, this will be when the potential of terminal 91 exceeds 13.6 volts, which is the potential of terminal 107, both relative to terminal 32. When the potential of terminal 91 does exceed 13.6 volts, the current will commence to flow through the emitter 86 and base 88 to establish a low impedance path between emitter 86 and collector 87 to shunt rheostat 89 and raises the potential of terminal 79 essentially to the potential of point 91, thus terminating the need for current via diode 121. This transfer becomes effective because the emitter 86 and base 88 of transistor 85 is a unidirectional conducting means together with diode 121 which compares the potential of terminals 91 and 107. This means of comparison selects the higher of two voltages to be passed to the voltage regulating portion of the rectifier circuit 11, which utilizes the control voltage established across terminals 32 and 79. As soon as this predetermined maximum value of voltage is reached at point 131, FIGURE 2, the control current is supplied from terminal 91 rather than from the current control source terminal 107. This higher potential on terminal 91 causes current flow through emitter 86 and base 88 and collector 87 and this makes base 88 essentially at the higher potential of point 91 rather than at the potential determined by point 107, to stop current flow through diode 121 very suddenly. Also, the transistor 85 is in a self-biased condition due to rheostat 89 and hence, there is some current flow through emitter 86 and collector 87 to raise the potential of terminal 79 to the potential of point 91. This increasing potential, as heretofore noted, turns on transistors 71 and 46 which shut off the rectifier circuit 11. The load current, therefore, drops to zero until the load voltage at the terminals of the battery drops to a value e.g. of 12.9 volts. This is following the curve 133 on FIGURE 2, and when this 12.9 volts value of load voltage is reached there will be a .1 volt drop across transistor 85 to maintain 12.8 volts of control voltage across terminals 32 and 79 and then the voltage regulating function again takes over to maintain the fully charged battery at the float value of a few milliamperes of charging current just sufficient to maintain the battery voltage of 12.9 volts. This float level of the battery voltage is maintained until the battery is discharged sufficiently to drop its terminal voltage to the point whereat the load current increases to the value set by the current limit adjustment of potentiometer 105 whereupon the current limit function again takes over control of the rectifier circuit 11. Thus, it will be seen that the rectifier circuit 11 combines three different control functions to control the load current and voltage in accordance with the curve shown in FIGURE 2. First, there is the predetermined low level of voltage which is the predominate control of voltage regulation set by potentiometer blade 82 and this determines the voltage level for a float charge of the battery load. Second, the current limit control set by potentiometer 105 controls the constant rate at which the battery will be charged whenever the battery terminal voltage has dropped to a level sufficiently low that the current limit function takes over. Third, the gasser control set by the value of rheostat 89 establishes a point 131 on the curve of FIGURE 2 at which the battery is predetermined to have been fully charged and at which the current regulation control is terminated and the load voltage returns to control of the voltage regulating function. It will be seen from the above description that the transistor 85 and the rectifier 121 are unidirectional conducting means to compare the load voltage and the current limit signal, and the greater of these two voltages controls the regulatable circuit.

The third transistor 71 is a means to connect the higher of the compared voltages to the reference voltage source, as determined by the zener diode 77, and to the first and second transistors 45 and 46. The first three transistors 45, 46 and 71 are a means to control the impedance of the magnetic amplifiers 28-31 in accordance with the control voltage across terminals 32 and 79.

The diode 121 conducts current from the current control signal 101 when ever the current limit signal 105 exceeds the control voltage across terminals 32 and 79. The current limit signal 105 is immediately effective to supersede control by the voltage regulating portion of the circuit 11 whenever the current reaches a predetermined maximum value set by the potentiometer 105. At this time, the diode 121 conducts to take over the control of control voltage from the load voltage and the fact that the second current transformer 95 is used means that this transformer 95 adjusts the current limit signal and the current transformer 94 is that which actually supplies the current through the diode 121 to the control voltage. In the example above, this requires eleven milliamperes and if this eleven milliamperes had to be drained from the current limit signal 106, this would upset the previously established value of voltage set by the potentiometer 105. By separating these two functions, with the current transformer 95 establishing the voltage at which the current limiting function commences, and the current transformer 94 actually supplying the current through diode 121, this makes certain that the current limiting function establishes a very sharp cutoff at the point 131 on FIGURE 2 whenever the predetermined maximum value of voltage has been reached.

Although this invention has been described in its preferred form with a certain degree of particularity, it is understood that the present disclosure of thep referred form has been made only by way of example and that numerous changes in the details of the circuit and the combination and arrangement of circuit elements may be resorted to without departing from the spirit and the scope of the invention as hereinafter claimed.

What is claimed is:

1. An electrical circuit, comprising, in combination, a control voltage source, first and second current transformers, primary winding means on said transformers and connected in said electrical responsive to current therein, a secondary on each of said current transformers, first and second rectifier means connected to said secondaries and deriving, respectively, a current control signal and a current limit signal, a transistor having emitter, collector and base electrodes, a first resistor and said transistor emitter and collector connected in series across said current control signal, a second resistor and a diode rectifier connected in series across said current limit signal, said transistor base being connected to the junction of said second resistor and diode rectifier, means comparing said current limit signal with said control voltage, and unidirectional conducting means conducting current from said current control signal to said control voltage upon said current limit signal exceeding said control voltage.

2. A controllable electrical circuit, comprising, in combination, first and second voltage input terminals, first and second output terminals for a load, a control voltage source, means connecting said control voltage in said electrical circuit to control same in accordance with the control voltage, first and second current transformers, primary winding means on said transformers and connected in said electrical circuit responsive to load current, a secondary on each of said current transformers, first and second rectifier means connected to said secondaries and deriving, respectively, a current control signal and a current limit signal, a transistor having emitter, collector and base electrodes, a first resistor and said transistor emitter and collector connected in series across said current control signal, a second resistor and a diode rectifier connected in series across said current limit signal, said transistor base being connected to the junction of said second resistor and diode rectifier, means comparing said current limit signal with said control voltage, and unidirectional conducting means comparing the voltage of said load with the voltage across said first resistor, whereby when the load current exceeds a predetermined maximum the current limit signal exceeds said control voltage and said diode rectifier conducts to raise the voltage on said second resistor to increase the impedance of said transistor and hence to increase the voltage across said first resistor to cause current flow through said unidirectional conducting means to increase said control voltage and to control said electrical circuit in accordance with said current limit signal rather than said load voltage.

3. An electrical circuit, comprising, in combination, first and second voltage input terminals, first and second output terminals for a load, a magnetic amplifier connected between said input and output terminals to control load current therebetween, a reference voltage source, impedance means connected in series with said reference voltage source and the series combination defining a control voltage source, means connecting said control voltage to said magnetic amplifier to control the impedance thereof in accordance with the control voltage, first and second current transformers, primary winding means on said transformers and connected in said electrical circuit responsive to load current, a secondary on each of said current transformers, first and second rectifier means connected to said secondaries and deriving, respectively, a current control signal and a current limit signal, a transistor having emitter, collector and base electrodes, a first resistor and said transistor emitter and collector connected in series across said current control signal, a second resistor and a diode rectifier connected in series across said current limit signal, said transistor base being connected to the junction of said second resistor and diode rectifier, means comparing said current limit signal with said control voltage, and unidirectional conducting means comparing the voltage of said load with the voltage across said first resistor, whereby when the load current exceeds a predetermined maximum the current limit signal exceeds said control voltage and said diode rectifier conducts to raise the voltage on said second resistor to increase the impedance of said transistor and hence to increase the voltage across said first resistor to cause current flow through said unidirectional conducting means to increase said control voltage and to control said electrical circuit in accordance with said current limit signal rather than said load voltage.

4. An electrical circuit, comprising, in combination, first and second voltage input terminals, first and second output terminals for a load, a magnetic amplifier connected between said input and output terminals to control load current therebetween, a control voltage source, means connecting said control voltage to said magnetic amplifier to control the impedance thereof in accordance with the control voltage, first and second current transformers, primary winding means on said transformers and connected in said electrical circuit responsive to load current, a secondary on each of said current transformers, first and second rectifier means connected to said secondaries and deriving, respectively, a current control signal and a current limit signal, a transistor having emitter, collector and base electrodes, a first resistor and said transistor emitter and collector connected in series across said current control signal, a second resistor and a diode rectifier connected in series across said current limit signal, said transistor base being connected to the junction of said second resistor and diode rectifier, means comparing said current limit signal with said control voltage, unidirectional conducting means comparing the voltage of said load with the voltage across said first resistor, whereby when the load current exceeds a predetermined maximum the current limit signal exceeds said control voltage and said diode rectifier conducts to raise the voltage on said second resistor to increase the impedance of said transistor and hence to increase the voltage across said first resistor to cause current flow through said unidirectional conducting means to said control voltage source, and means to cause increased control voltage to increase the impedance of said magnetic amplifier to decrease the voltage of said load, whereby said electrical circuit is then controlled in accordance with said current limit signal rather than said load voltage.

5. An electrical circuit, comprising, in combination, first and second alternating voltage input terminals, first and second D.C. output terminals for a load, a magnetic amplifier connected between said input and output terminals to control load current therebetween, first and second transistors, a D.C. voltage source, means connecting said first transistor and said D.C. source to conduct current through said magnetic amplifier to decrease the impedance thereof, means connecting said second transistor and said D.C. source to conduct current through said magnetic amplifier to increase the impedance thereof, a third transistor connected to said first transistor to effect inversely proportional conduction thereof, a control voltage source, means connecting said control voltage to said magnetic amplifier to control the impedance thereof in accordance with the control voltage, means connected in said electrical circuit responsive to load current and deriving a current control signal and a current limit signal, a fourth transistor having emitter, collector and base electrodes, a first resistor and said fourth transistor emitter and collector connected in series across said current control signal, a second resistor and a diode rectifier connected in series across said current limit signal, said fourth transistor base being connected to the junction of said second resistor and diode rectifier, means comparing said current limit signal with said control voltage and unidirectional conducting means comparing the voltage of said load with the voltage across said first resistor, whereby when the load current exceeds a predetermined maximum the current limit signal exceeds said control voltage and said diode rectifier conducts to raise the voltage on said second resistor to increase the impedance of said fourth transistor and hence to increase the voltage across said first resistor to cause current flow through said unidirectional conducting means to increase current flow through said third transistor and hence to control said electrical circuit in accordance with said current limit signal rather than said load voltage.

6. An electrical circuit, comprising, in combination, first and second voltage input terminals, first and second output terminals for a load, a magnetic amplifier connected between said input and output terminals to control load current therebetween, first and second transistors, a D.C. voltage source, means connecting said first transistor and said D.C. source to conduct current through said magnetic amplifier to decrease the impedance thereof, means connecting said second transistor and said D.C. source to conduct current through said magnetic amplifier to increase the impedance thereof, a third transistor having, emitter, collector, and base electrodes, means connecting said emitter to said second output terminal, means connecting said collector to relatively bias said first and second transistors, an impedance connected between said base and collector of said third transistor, a reference voltage source, resistor means connected in series with said reference voltage source and the series combination defining a control voltage source with positive and negative terminals, means connecting said control voltage source negative terminal to said first output terminal, means connecting said control voltage source positive terminal to said third transistor collector, means connected in said electrical circuit responsive to load current and deriving a current control signal and a current limit signal, a fourth transistor having emitter, collector and base electrodes, a first resistor and said fourth transistor emitter and collector connected in series across said current control signal, a second resistor and a diode rectifier connected in series across said current limit signal, said fourth transistor base being connected to the junction of said second resistor and diode rectifier, means comparing said current limit signal with said control voltage and unidirectional conducting means including said third transistor comparing said load voltage with the voltage across said first resistor, whereby when the load current exceeds a predetermined maximum the current limit signal exceeds said control voltage and said diode rectifier conducts to raise the voltage on said second resistor to increase the impedance of said fourth transistor and hence to increase the voltage across said first resistor to cause current flow through said unidirectional conducting means and hence to produce a voltage drop across said impedance to increase the impedance of said third transistor to essentially stop current flow through said third transistor emitter from said second ouput terminal and hence to control said electrical circuit in accordance with said current limit signal rather than said load voltage.

7. A regulatable rectifier circuit, comprising, in combination, first and second alternating voltage input terminals, first and second D.C. output terminals for a load, first and second magnetic amplifier windings, rectifiers connected in a bridge circuit between said input terminals and said output terminals and establishing first and second alternative paths for flow of alternating current, said first path including said first magnetic amplifier winding and said second path including said second magnetic amplifier winding, first and second transistors, a D.C. voltage source, means establishing a neutral on said alternating voltage input, means establishing a neutral between said first and second magnetic amplifier windings, means connecting said first transistor and said D.C. source to conduct current from said input neutral to said magnetic amplifier neutral, means connecting said second transistor and said D.C. source to conduct current from said magnetic amplifier neutral to said input neutral, a third transistor having, emitter, collector, and base electrodes, means connecting said emitter to said second D.C. output terminal, means connecting said collector to relatively bias said first and second transistors, an impedance connected between said base and collector of said third transistor, a reference voltage source, resistor means connected in series with said reference voltage source and the series combination defining a control voltage source with positive and negative terminals, means connecting said control voltage source negative terminal to said first D.C. output terminal, means connecting said control voltage source positive terminal to said third transistor collector, means connected in said bridge circuit and deriving a current control signal and a current limit signal, a fourth transistor having emitter, collector and base electrodes, a first resistor and said fourth transistor emitter and collector connected in series across said current control signal, a second resistor and a diode rectifier connected in series across said current limit signal, said fourth transistor base being connected to the junction of said second resistor and diode rectifier, means comparing said current limit signal with said control voltage and unidirectional conducting means including said third transistor comparing said load voltage with the voltage across said first resistor, whereby when the load current exceeds a predetermined maximum the current limit signal exceeds said control voltage and said diode rectifier conducts to raise the voltage on said second resistor to increase the impedance of said fourth transistor and hence to increase the voltage across said first resistor to cause current flow through said unidirectional conducting means and hence to produce a voltage drop across said impedance to increase the impedance of said third transistor to essentially stop current flow through said third transistor emitter from said second output terminal and hence to control said regulatable rectifier circuit in accordance with said current limit signal rather than said load voltage.

8. A regulatable rectifier circuit, comprising, in combination, first and second alternating voltage input terminals, first and second D.C. output terminals for a load, first and second magnetic amplifier windings, rectifiers connected in a bridge circuit between said input terminals and said output terminals and establishing first and second alternative paths for flow of alternaitng current, said first path including said first magnetic amplifier winding and said second path including said second magnetic amplifier winding, first and second transistors, a D.C. voltage source, means establishing a neutral on said alternating voltage input, means establishing a neutral between said first and second magnetic amplifier windings, means connecting said first transistor and said D.C. source to conduct current from said input neutral to said magnetic amplifier neutral, means connecting said second transistor and said D.C. source to conduct current from said magnetic amplifier neutral to said input neutral, a third transistor connected to said first transistor to effect inversely proportional conduction thereof, a PNP fourth transistor having, emitter, collector, and base electrodes, said emitter being connected to said second D.C. output terminal, said collector being connected to the emitter of said third transistor, an impedance connected between said base and collector of said fourth transistor, a reference voltage source, resistor means connected in series with said reference voltage source and the series combination defining a control voltage source with positive and negative terminals, means connecting said control voltage source negative terminal to said first D.C. output terminal, means connecting said control voltage source positive terminal to said third transistor emitter, means connected in said bridge circuit and developing a current control signal source and a current limit signal source each with positive and negative terminals, first unidirectional conducting means connected to conduct current from the positive terminal of said current control signal source to said fourth transistor base, a fifth transistor having emitter, collector and base electrodes, a first resistor and said fifth transistor emitter and collector connected in series between said current control signal source positive and negative terminals, a second resistor and a diode rectifier connected in series across the terminals of said current limit signal source, said fifth transistor base being connected to the junction of said second resistor and diode rectifier, the positive terminal of said current limit signal source being connected to the positive terminal of said control voltage source, whereby when the load current exceeds a predetermined maximum the current limit signal exceeds said control voltage and said diode rectifier conducts to raise the voltage on said second resistor to increase the impedance of said fifth transistor and hence to increase the voltage across said first resistor to cause current flow through said first unidirectional conducting means and hence to produce a voltage drop across said impedance to increase the impedance of said fourth transistor to essentially stop current flow through said fourth transistor emitter from said second D.C. output terminal and hence to control said regulatable rectifier circuit in accordance with said current limit signal rather than said load voltage, and whereby when said load voltage exceeds a predetermined maximum value current flows through said fourth transistor emitter and collector to raise said control voltage and to raise the potential on said fourth transistor base to cease current flow through said first unidirectional conducting means and hence control said regulatable rectifier circuit in accordance with said load voltage rather than said current limit signal to decrease the output of said regulatable rectifier to a predetermined float value of load voltage.

9. A regulatable rectifier circuit, comprising, in combination, first and second alternating voltage input terminals, first and second D.C. output terminals for a load, first, second, third and fourth magnetic amplifier windings, first second, third and fourth rectifiers connected in a bridge circuit between said input terminals and said output terminals and establishing first and second alternative paths for flow of alternating current, said first input terminal being connected between said first and second rectifiers and said second input terminal being connected between said third and fourth rectifiers, said first path including said first and fourth magnetic amplifier windings in series and said second path including said second and third magnetic amplifier windings in series, said first and fourth magnetic amplifier windings being on a common core, said second and third magnetic amplifier windings being on another common core, first and second power transistors, a D.C. voltage source having positive and negative terminals and a midtap, means connecting said midtap to a neutral on said alternating voltage input, means establishing a neutral between said first and third magnetic amplifier windings, means connecting said first transistor and said D.C. source to conduct current from said input neutral to said magnetic amplifier neutral, means connecting said second transistor and said D.C. source to conduct current from said magnetic amplifier neutral to said input neutral, a third transistor connected to said first transistor to effect inversely proportional conduction thereof, a PNP fourth transistor having, emitter, collector, and base electrodes, said emitter being connected to said second D.C. output terminal, said collector being connected to the emitter of said third transistor, a rheostat connected between said base and collector of said fourth transistor, a reference voltage source, resistor means connected in series with said reference voltage source and the series combination defining a control voltage source with positive and negative terminals, means connecting said control voltage source negative terminal to said first D.C. output terminal, means connecting said control voltage source positive terminal to said third transistor emitter, means connected in said bridge circuit and developing a current control signal source and a current limit signal source each with positive and negative terminals, first unidirectional conducting means connected to conduct current from the positive terminal of said current control signal source to said fourth transistor base, a fifth transistor having emitter, collector and base electrodes, a first resistor and said fifth transistor emitter and collector connected in series between said current control signal source positive and negative terminals, a second resistor and a diode rectifier connected in series across the terminals of said current limit signal source, said fifth transistor base being connected to the junction of said second resistor and diode rectifier, the positive terminal of said current limit signal source being connected to the positive terminal of said control voltage source, whereby when the load current exceeds a predetermined maximum the current limit signal exceeds said control voltage and said diode rectifier conducts to raise the voltage on said second resistor to increase the impedance of said fifth transistor and hence to increase the voltage across said first resistor to cause current flow through said first unidirectional conducting means and hence to produce a voltage drop across said rheostat to increase the impedance of said fourth transistor to essentially stop current flow through said fourth transistor emitter from said second D.C. output terminal and hence to control said regulatable rectifier circuit in accordance with said current limit signal rather than said load voltage.

10. A regulatable circuit, comprising, in combination, first and second alternating voltage input terminals, first and second output terminals for a load, a magnetic amplifier connected between said input and output terminals to pass at least part of the load current therethrough, first, second and third transistors, a D.C. voltage source, means connecting said D.C. source and said first transistor to conduct current through said magnetic amplifier in the same direction as load current flow therethrough to increase the output of said regulatable circuit, means connecting said D.C. source and said second transistor to conduct current through said magnetic amplifier in the opposite direction to decrease the output of said regulatable circuit, means connecting said third transistor to effect conduction of said second transistor in direct accordance therewith, means deriving a current limit signal in accordance with load current, unidirectional conducting means to compare said current limit signal with the load voltage at said output terminals, a reference voltage source, means to connect the higher of the compared voltages to said reference voltage source and to said third transistor, whereby when the output voltage is below a predetermined value said current limit signal controls said regulatable circuit and when said output voltage is above said predetermined value said output voltage controls said regulatable circuit.

11. A regulatable circuit, comprising, in combination, first and second alternating voltage input terminals, first and second D.C. output terminals for a load, a magnetic amplifier winding, a rectifier, means connecting said rectifier in series with said magnetic amplifier winding, first and second transistors each having emitter, collector and base electrodes, a D.C. voltage source having positive and negative terminals and a midtap, means connecting said midtap to a neutral on said alternating voltage input, said first transistor emitter being connected to said positive terminal, said second transistor collector being connected to said negative terminal, a feedback resistor connecting said first transistor collector to said second transistor emitter, a first transistor biasing resistor connecting said first transistor base to said midtap, a second transistor biasing resistor connecting said second transistor base to said negative terminal, a diode connected to conduct current from said first transistor collector to said second transistor base, means connecting both said transistors to said magnetic amplifier winding, means deriving a current limit signal in accordance with load current, unidirectional conducting means to compare said current limit signal with the load voltage at said D.C. output terminals, a reference voltage source, means to connect the higher of the compared voltages to said reference voltage source and to said first and second transistors, whereby when the output voltage is below a predetermined value said current limit signal controls said rectifier circuit and when said output voltage is above said predetermined value said output voltage controls said rectifier circuit.

12. A regulatable rectifier circuit, comprising, in combination, first and second alternating voltage input terminals, first and second D.C. output terminals for a load, first, second, third and fourth magnetic amplifier windings, first, second, third and fourth rectifiers connected in a bridge circuit between said input terminals and said output terminals and establishing first and second alternative paths for flow of alternating current, said first input terminal being connected between said first and second rectifiers and said second input terminal being connected between said third and fourth rectifiers, said first path including said first and fourth magnetic amplifier windings in series and said second path including said second and third magnetic amplifier windings in series, said first and fourth magnetic amplifier windings being on a common core, said second and third magnetic amplifier windings being on another common core, first and second transistors, a D.C. voltage source, means connecting said D.C. source and said first transistor to conduct current through part of said first path in the same direction as load current flow therethrough to increase the output of said rectifier circuit, means connecting said D.C. source and said second transistor to conduct current in the opposite direction to decrease the output of said rectifier circuit, means deriving a current limit signal in accordance with load current, unidirectional conducting means to compare said current limit signal with the load voltage at said D.C. output terminals, a reference voltage source, means to connect the higher of the compared voltages to said reference voltage source and to said first and second transistors, whereby when the output voltage is below a predetermined value said current limit signal controls said rectifier circuit and when said output voltage is above said predetermined value said output voltage controls said rectifier circuit.

13. A voltage and current regulatable rectifier circuit, comprising, in combination, first and second alternating voltage input terminals, first and second D.C. output terminals for a load, first, second, third and fourth magnetic amplifier windings, first, second, third and fourth rectifiers connected in a bridge circuit between said input terminals and said output terminals and establishing first and second alternative paths for flow of alternating current, said first input terminal being connected between said first and second rectifiers and said second input terminal being connected between said third and fourth rectifiers, said first path including said first and fourth magnetic amplifier windings in series and said second path including said second and third magnetic amplifier windings in series, said first and fourth magnetic amplifier windings being on a common core, said second and third magnetic amplifier windings being on another common core, first and second transistors, a D.C. voltage source, means connecting said D.C. source and said first transistor to conduct current through said first magnetic amplifier winding in the same direction as load current flow therethrough to increase the output of said regulatable rectifier circuit, means connecting said D.C. source and said second transistor to conduct current in the opposite direction to decrease the output of said regulatable rectifier circuit, a current transformer having first and second primary windings serially connected in said first and second paths, respectively, a secondary on said current transformer, rectifier means connected to said secondary and deriving a current limit signal in accordance with load current, unidirectional conducting means to compare said current limit signal with the load voltage at said D.C. output terminals, a reference voltage source, means to connect the higher of the compared voltages to said reference voltage source and to said first and second transistors, whereby when the output voltage is below a predetermined value said current limit signal controls said rectifier circuit and when said output voltage is above said predetermined value said output voltage controls said rectifier circuit.

14. A voltage and current regulatable rectifier circuit, comprising, in combination, first and second alternating voltage input terminals, first and second D.C. output output temrinals for a load, first, second, third and fourth magnetic amplifier windings, first, second, third and fourth rectifiers connected in a bridge circuit between said input terminals and said output terminals and establishing first and second alternative paths for flow of alternating current, said first input terminal being connected between said first and second rectifiers and said second input terminal being connected between said third and fourth rectifiers, said first path including said first and fourth magnetic amplifier windings in series and said second path including said second and third magnetic amplifier windings in series, said first and fourth magnetic amplifier windings being on a common core, said second and third magnetic amplifier windings being on another common core, first and second transistors each having emitter, collector and base electrodes, a D.C. voltage source having positive and negative terminals and a midtap, means connecting said midtap to a neutral on said alternating voltage input, said first transistor emitter being connected to said positive terminal, said second transistor collector being connected to said negative terminal, a feedback resistor connecting said first transistor collector to said second transistor emitter, a first transistor biasing resistor connecting said first transistor base to said midtap, a second transistor biasing resistor connecting said second transistor base to said negative terminal, a diode connected to conduct current from said first transistor collector to said second transistor base, means establishing a neutral between said first and third magnetic amplifier windings, means connecting said last mentioned neutral to said second transistor emitter, means deriving a current limit signal in accordance with load current, unidirectional conducting means to compare said current limit signal with the load voltage at said D.C. output terminals, a reference voltage source, means to connect the higher of the compared voltages to said reference voltage source and to said first and second transistors, whereby when said first transistor has the greater conductivity current flows through said feedback resistor to bias off the second transistor and also flows through said first and third magnetic amplifier windings in the same direction as the load current to increase the output of said regulatable rectifier circuit, and whereby when said first transistor has the lesser conductivity current through the feedback resistor provides insufficient bias and hence said second transistor increases conduction of reset current through said first and third magnetic amplifier windings in a direction opposite to load current flow therethrough to increase the impedance of said magnetic amplifier to decrease the output of said regulatable rectifier circuit.

15. A voltage and current regulatable rectifier circuit, comprising, in combination, first and second alternating voltage input terminals, first and second D.C. output terminals for a load, first, second, third and fourth magnetic amplifier windings, first, second, third and fourth rectifiers connected in a bridge circuit between said input terminals and said output terminals and establishing first and second alternative paths for flow of alternating current, said first input terminal being connected between said first and second rectifiers and said second input terminal being connected between said third and fourth rectifiers, said first path including said first and fourth magnetic amplifier winding in series and said second path including said second and third magnetic amplifier windings in series, said first and fourth magnetic amplifier windings being on a comon core, said second and third magnetic amplifier windings being on another common core, first and second PNP power transistors each having emitter, collector and base electrodes, a D.C. voltage source having positive and negative terminals and a midtap, means connecting said midtap to a neutral on said alternating voltage input, said first transistor emitter being connected to said positive terminal, said second transistor collector being connected to said negative terminal, a feedback resistor connecting said first transistor collector to said second transistor emitter, a first transistor biasing resistor connecting said first transistor base to said midtap, a second transistor biasing resistor connecting said second transistor base to said negative terminal, a diode connected to conduct current from said first transistor collector to said second transistor base, a bleeder resistor connected between said midtap and said first D.C. output terminal to establish a determinable potential difference therebetween, means establishing a neutral between said first and third magnetic amplifier windings, means connecting said last mentioned neutral to said second transistor emitter, a current transformer having first and second primary windings serially connected in said first and second paths, respectively, a secondary on said current transformer, rectifier means connected to said secondary and deriving a current limit signal in accordance with load current, unidirectional conducting means to compare said current limit signal with the load voltage at said D.C. output terminals, a reference voltage source, means to connect the higher of the compared voltages to said reference voltage source and to said first and second transistors, whereby when said first transistor has the greater conductivity current flows through said feedback resistor to bias off the second transistor and also flows through said first and third magnetic amplifier windings in the same direction as the load current to increase the output of said regulatable rectifier circuit, and whereby when said first transistor has the lesser conductivity current through the feedback resistor provides insufficient bias and hence said second transistor increases conduction of reset current through said first and third magnetic amplifier windings in a direction opposite to load current flow therethrough to increase the impedance of said magnetic amplifiers to decrease the output of said regulatable rectifier circuit.

16. A regulatable circuit, comprising, in combination, first and second alternating voltage input terminals, first and second output terminals for a load, a magnetic amplifier connected between said input and output terminals to pass at least part of the load current therethrough, first, second and third transistors, a D.C. voltage source, means connecting said D.C. source and said first transistor to conduct current through said magnetic amplifier in the same direction as load current flow therethrough to increase the output of said regulatable circuit, means connecting said D.C. source and said second transistor to conduct current through said magnetic amplifier in the opposite direction to decrease the output of said regulatable circuit, means connecting said third transistor to effect conduction of said second transistor in direct accordance therewith, a reference voltage source, and means connecting said reference voltage source to said output terminals and to said third transistor, whereby when said output voltage decreases the third transistor current decreases to increase the current flow through said first transistor and through said magnetic amplifier in the same direction as the load current to increase the output of said regulatable circuit, and whereby when said output voltage increases the third transistor current increases to increase current flow through said second transistor and to conduct reset current through said magnetic amplifier in a direction opposite to load current flow therethrough to increase the impedance of said magnetic amplifier to decrease the output of said regulatable circuit.

17. A voltage regulatable rectifier circuit, comprising, in combination, first and second alternating voltage input terminals, first and second D.C. output terminals for a load, a magnetic amplifier winding, a rectifier, means connecting said rectifier in series with said magnetic amplifier winding, first, second and third PNP power transistors each having emitter, collector and base electrodes, a D.C. voltage source having positive and negative terminals and a midtap, means connecting said midtap to a neutral on said alternating voltage input, said first transistor emitter being connected to said positive terminal, said second transistor collector being connected to said negative terminal, a feedback resistor connecting said first transistor collector to said second transistor emitter, a first transistor biasing resistor connecting said first transistor base to said midtap, a second transistor biasing resistor connecting said second transistor base to said negative terminal, a diode connected to conduct current from said first transistor collector to said second transistor base, a bleeder resistor connected between said midtap and said first D.C. output terminal to establish a determinable potential difference therebetween, means connecting both said transistors to said magnetic amplifier winding, means connecting said second D.C. output terminal to said third transistor emitter, means connecting said third transistor collector to said first transistor base, a reference voltage source, and means connecting said reference voltage source between said first D.C. output terminal and said third transistor base, whereby when said D.C. output voltage decreases the third transistor base becomes more positive to decrease current flow through said third transistor and to decrease the voltage drop across said first biasing resistor to increase the current flow through said first transistor and said feedback resistor to bias off the second transistor and increased current flows through said magnetic amplifier winding in the same direction as the load current to increase the output of said regulatable rectifier circuit, and whereby when said D.C. output voltage increases the third transistor base becomes less positive to increase current flow through said third transistor and hence said second transistor increases conduction of reset current through said magnetic amplifier winding in a direction opposite to load current flow therethrough to increase the impedance of said magnetic amplifier to decrease the output of said regulatable rectifier circuit.

18. A voltage regulatable rectifier circuit, comprising, in combination, first and second alternating voltage input terminals, first and second D.C. output terminals for a load, first and second magnetic amplifier windings, rectifiers connected in a bridge circuit between said input terminals and said output terminals and establishing first and second alternative paths for flow of alternating current, said first path including said first magnetic amplifier winding and said second path including said second magnetic amplifier winding, first, second and third transistors, a D.C. voltage source, means connecting said D.C. source and said first transistor to conduct current through part of said first path in the same direction as load current flow therethrough to increase the output of said rectifier circuit, means connecting said D.C. source and said second transistor to conduct current through part of said first path in the opposite direction to decrease the output of said rectifier circuit, means connecting said third transistor to effect conduction of said second transistor in direct accordance therewith, a reference voltage source, and means connecting said reference voltage source to said D.C. output terminals and to said third transistor, whereby when said D.C. output voltage decreases the third transistor current decreases to increase the current flow through said first transistor and through said first magnetic amplifier winding in the same direction as the load current to increase the output of said regulatable rectifier circuit, and whereby when said D.C. output voltage increases the third transistor current increases to increase current flow through said second transistor and to conduct reset current through said first magnetic amplifier winding in a direction opposite to load current flow therethrough to decrease the output of said regulatable rectifier circuit.

19. A voltage regulatable rectifier circuit, comprising, in combination, first and second alternating voltage input terminals, first and second D.C. output terminals for a load, first and second magnetic amplifier windings, first, second, third and fourth rectifiers connected in a bridge circuit between said input terminals and said output terminals and establishing first and second alternative paths for flow of alternating current, said first input terminal being connected between said first and second rectifiers and said second input terminal being connected between said third and fourth rectifiers, said first path including said first magnetic amplifier winding and said second path including said second magnetic amplifier winding, first and second transistors, a D.C. voltage source, means connecting said D.C. source and said first transistor to conduct current through part of said first path in the same direction as load current flow therethrough to increase the output of said rectifier circuit, means connecting said D.C. source and said second transistor to conduct current through part of said first path in the opposite direction to decrease the output of said rectifier circuit, a third transistor having emitter, collector and base electrodes, means connecting said third transistor emitter to said second D.C. output terminal, means connecting said third transistor collector to said first transistor, a reference voltage source, and means connecting said reference voltage source between said first D.C. output terminal and said third transistor base, whereby when said D.C. output voltage decreases the third transistor base becomes more positive to decrease current flow through said third transistor to increase the current flow through said first transistor to bias off the second transistor and increased current flows through said first magnetic amplifier winding in the same direction as the load current to increase the output of said regulatable rectifier circuit, and whereby when said D.C. output voltage increases the third transistor base becomes less positive to increase current flow through said third transistor and hence said second transistor increases conduction of reset current through said first magnetic amplifier winding in a direction opposite to load current flow therethrough to increase the impedance of said magnetic amplifiers to decrease the output of said regulatable rectifier circuit.

20. A voltage regulatable rectifier circuit, comprising, in combination, first and second alternating voltage input terminals, first and second D.C. output terminals for a load, first, second third and fourth magnetic amplifier windings, first, second, third and fourth rectifiers connected in a bridge circuit between said input terminals and said output terminals and establishing first and second alternative paths for flow of alternating current, said first input terminal being connected between said first and second rectifiers and said second input terminal being connected between said third and fourth rectifiers, said first path including said first and fourth magnetic amplifier windings in series and said second path including said second and third magnetic amplifier windings in series, said first and fourth magnetic amplifier windings being on a common core, said second and third magnetic amplifier windings being on another common core, first and second transistors each having emitter, collector and base electrodes, a D.C. voltage source having positive and negative terminals and a midtap, means connecting said midtap to a neutral on said alternating voltage input, said first transistor emitter being connected to said positive terminal, said second transistor collector being connected to said negative terminal, a feedback resistor connecting said first transistor collector to said second transistor emitter, a first transistor biasing resistor connecting said first transistor base to said midtap, a second transistor biasing resistor connecting said second transistor base to said negative terminal, means connecting said first transistor collector to said second transistor base, means establishing a neutral between said first and third magnetic amplifier windings, means connecting said last mentioned neutral to said second transistor emitter, a third transistor, means connecting said third transistor to said second D.C. output terminal, a reference voltage source, and means connecting said reference voltage source between said first D.C. output terminal and said third transistor, whereby when said D.C. output voltage decreases the third transistor passes less current to decrease the voltage drop across said first biasing resistor to increase the current flow through said feedback resistor to bias off the second transistor and increased current flows through said first and third magnetic amplifier windings in the same direction as the load current to increase the output of said regulatable rectifier circuit, and whereby when said D.C. output voltage increases the third transistor passes more current and hence said second transistor increases conduction of reset current through said first and third magnetic amplifier windings in a direction opposite to load current flow therethrough to increase the impedance of said magnetic amplifiers to decrease the output of said regulatable rectifier circuit.

21. A voltage regulatable rectifier circuit, comprising, in combination, first and second alternating voltage input terminals, first and second D.C. output terminals for a load, first, second, third and fourth magnetic amplifier windings, first, second, third and fourth rectifiers connected in a bridge circuit between said input terminals and said output terminals and establishing first and second alternative paths for flow of alternating current, said first input terminal being connected between said first and second rectifiers and said second input terminal being connected between said third and fourth rectifiers, said first path including said first and fourth magnetic amplifier windings in series and said second path including said second and third magnetic amplifier windings in series, said first and fourth magnetic amplifier windings being on a common core, said second and third magnetic amplifier windings being on another common core, first, second and third PNP power transistors each having emitter, collector and base electrodes, a D.C. voltage source having positive and negative terminals and a midtap, means connecting said midtap to a neutral on said alternating voltage input, said first transistor emitter being connected to said positive terminal, said second transistor collector being connected to said negative terminal, feedback resistor connecting said first transistor collector to said second transistor emitter, a first transistor biasing resistor connecting said first transistor base to said midtap, a second transistor biasing resistor connecting said second transistor base to said negative terminal, a diode connected to conduct current from said first transistor collector to said second transistor base, a bleeder resistor connected between said midtap and said first D.C. output terminal to establish a determinable potential difference therebetween, means establishing a neutral between said first and third magnetic amplifier windings, means connecting said last mentioned neutral to said second transistor emitter, means connecting said second D.C. output terminal to said third transistor emitter, means connecting said third transistor collector to said first transistor base, a reference voltage source, and means connecting said reference voltage source between said first D.C. output terminal and said third transistor base, whereby when said D.C. output voltage decreases the third transistor base becomes more positive to decrease current flow through said third transistor and to decrease the voltage drop across said first biasing resistor to increase the current flow through said first transistor and said feedback resistor to bias off the second transistor and increased current flows through said first and third magnetic amplifier windings in the same direction as the load current to increase the output of said regulatable rectifier circuit, and whereby when said D.C. output voltage increases the third transistor base becomes less positive to increase current flow through said third transistor and hence said second transistor increases conduction of reset current through said first and third magnetic amplifier windings in a direction opposite to load current flow therethrough to increase the impedance of said magnetic amplifiers to decrease the output of said regulatable rectifier circuit.

22. A regulatable rectifier circuit, comprising, in combination, first and second alternating voltage input terminals, first and second D.C. output terminals for a load, a magnetic amplifier winding, a rectifier, means connecting said rectifier in series with said magnetic amplifier winding between said output terminals, first and second PNP power transistors each having emitter, collector and base electrodes, a D.C. voltage source having positive and negative terminals and a midtap, means connecting said midtap to a neutral on said alternating voltage input, said first transistor emitter being connected to said positive terminal, said second transistor collector being connected to said negative terminal, a feedback resistor connecting said first transistor collector to said second transistor emitter, a first transistor biasing resistor connecting said first transistor base to said midtap, a second transistor biasing resistor connecting said second transistor base to said negative terminal, a silicon diode connected to conduct current from said first transistor collector to said second transistor base, a bleeder resistor connected between said midtap and said first D.C. output terminal to establish a determinable potential difference therebetween, means connecting both said transistors to said magnetic amplifier winding, and means to control the relative conductivity of said transistors whereby when said first transistor has the greater conductivity current flows through said feedback resistor to bias off the second transistor and also flows through said magnetic amplifier winding in the same direction as the load current to increase the output of said regulatable rectifier circuit, and whereby when said first transistor has the lesser conductivity current through the feedback resistor provides insufficient bias and hence said second transistor increases conduction of reset current through said magnetic amplifier winding in a direction opposite to load current flow therethrough to increase the impedance of said magnetic amplifier to decrease the output of said regulatable rectifier circuit.

23. A regulatable rectifier circuit, comprising, in combination, first and second alternating voltage input terminals, first and second D.C. output terminals for a load, first, second, third and fourth magnetic amplifier windings, first, second, third and fourth rectifiers connected in a bridge circuit between said input terminals and said output terminals and establishing first and second alternative paths for flow of alternating current, said first input terminal being connected between said first and second rectifiers and said second input terminal being connected between said third and fourth rectifiers, said first path including said first and fourth magnetic amplifier windings in series and said second path including said second and third magnetic amplifier windings in series, said first and fourth magnetic amplifier windings being on a common core and said second and third magnetic amplifier windings being on another common core, first and second PNP power transistors each having emitter, collector and base electrodes, a D.C. voltage source having positive and negative terminals and a midtap, means connecting said midtap to a neutral on said alternating voltage input, said first transistor emitter being connected to said positive terminal, said second transistor collector being connected to said negative terminal, a feedback resistor connecting said first transistor collector to said second transistor emitter, a first transistor biasing resistor connecting said first transistor base to said midtap, a second transistor biasing resistor connecting said second transistor base to said negative terminal, a silicon diode connected to conduct current from said first transistor collector to said second transistor base, a bleeder resistor connected between said midtap and said first D.C. output terminal to establish a determinable potential difference therebetween, means establishing a neutral between said first and third magnetic amplifier windings, means connecting said last mentioned neutral to said second transistor emitter, and means to control the relative conductivity of said transistors whereby when said first transistor has the greater conductivity current flows through said feedback resistor to bias off the second transistor and also flows through said first and third magnetic amplifier windings in the same direction as the load current to increase the output of said regulatable rectifier circuit, and whereby when said first transistor has the lesser conductivity current through the feedback resistor provides insufficient bias and hence said second transistor increases conduction of reset current through said first and third magnetic amplifier windings in a direction opposite to load current flow therethrough to increase the impedance of said magnetic amplifiers to decrease the output of said regulatable rectifier circuit.

24. A regulatable rectifier circuit, comprising, in combination, first and second alternating voltage input terminals, first and second D.C. output terminals for a load, first, second, third and fourth magnetic amplifier windings, first, second, third and fourth rectifiers connected in a bridge circuit between said input terminals and said output terminals and establishing first and second alternate paths for flow of alternating current, said first input terminal being connected between said first and second rectifiers and said second input terminal being connected between said third and fourth rectifiers, said first path including said first and fourth magnetic amplifier windings in series and said second path including said second and third magnetic amplifier windings in series, said first and fourth magnetic amplifier windings being on a common core and said second and third magnetic amplifier windings being on another common core, and means to pass direct current through a part of each of said paths to pass reset current through said first and third magnetic amplifier windings in a direction opposite to the flow of load current therethrough to reset said magnetic amplifiers and hence control the impedance thereof.

25. A regulatable rectifier circuit, comprising, in combination, first and second alternating voltage input terminals, first and second D.C. output terminals for a load, first, second, third and fourth magnetic amplifier windings with said first and fourth on a common core and said second and third on another common core, first, second, third and fourth rectifiers in series with said first, second, third and fourth windings, respectively, and connected in a bridge circuit between said input terminals and said output terminals, said first input terminal being connected between said first and second rectifiers and said second input terminals being connected between said third and fourth rectifiers, a control transformer having a center tap and connected across the series combination of said first and third rectifiers, an alternating voltage input transformer connected to said input terminals and having a center tap, and means to pass direct current from the center tap of said input transformer to the center tap of said control transformer to pass reset current through said first and third magnetic amplifier windings in a direction opposite to the flow of load current therethrough to reset said magnetic amplifiers and hence control the impedance thereof.

26. A regulatable rectifier circuit, comprising, in combination, alternating voltage input means to said rectifier circuit, first and second D.C. output terminals for connection to a load, magnetic amplifier means connected in said rectifier circuit to variably control the voltage at said output terminals, a control voltage source with positive and negative terminals, means connecting said control voltage source negative terminal to said first D.C. output terminal, first transistor means, means connecting said control voltage source positive terminal through said first transistor means to said second D.C. output terminal, means connected in said rectifier circuit and developing a current control signal source and a current limit signal source, unidirectional conducting means connected to conduct current from said current control signal source to said first transistor means, second transistor means, means including said second transistor means comparing said current limit signal with said control voltage, whereby when the load voltage exceeds a predetermined maximum value current flows through said first transistor means to raise said control voltage to cease current flow through said unidirectional conducting means and hence control said regulatable rectifier circuit in accordance with said load voltage rather than said current limit signal to decrease the output of said regulatable rectifier to a predetermined float value of load voltage.

27. A regulatable rectifier circuit, comprising, in combination, alternating voltage input means to said rectifier circuit, first and second D.C. output terminals for connection to a load, magnetic amplifier means connected in said rectifier circuit to variably control the voltage at said output terminals, a transistor having emitter, collector, and base electrodes, said emitter being connected to said second D.C. output terminal, said collector being connected in circuit to pass current to increase the impedance of said magnetic amplifier means and hence decrease the output voltage at said output terminals, an impedance connected between said base and collector of said transistor, a control voltage source with positive and negative terminals, means connecting said control voltage source negative terminal to said first D.C. output terminal, means connecting said control voltage source positive terminal to said transistor collector, means connected in said rectifier circuit and developing a current control signal source and a current limit signal source, unidirectional conducting means connected to conduct current from said current control signal source to said first transistor base, and means comparing said current limit signal with said control voltage, whereby when the load voltage exceeds a predetermined maximum value current flows through said first transistor emitter and collector to raise said control voltage and to raise the potential on said transistor base to cease current flow through said unidirectional conducting means and hence control said regulatable rectifier circuit in accordance with said load voltage rather than said current limit signal to decrease the output of said regulatable rectifier to a predetermined float value of load voltage.

28. A regulatable rectifier circuit, comprising, in combination, alternating voltage input means to said rectifier circuit, first and second D.C. output terminals for connection to a load, magnetic amplifier means connected in said rectifier circuit to variably control the voltage at said output terminals, a first transistor having emitter, collector, and base electrodes, said emitter being connected to said second D.C. output terminal, said collector being connected in circuit to pass current to increase the impedance of said magnetic amplifier means and hence decrease the output voltage at said output terminals, an impedance connected between said base and collector of said first transistor, a control voltage source with positive and negative terminals, means connecting said control voltage source negative terminal to said first D.C. output terminal, means connecting said control voltage source positive terminal to said first transistor collector, means connected in said rectifier circuit and developing a current control signal source and a current limit signal source each with positive and negative terminals, unidirectional conducting means connected to conduct current from the positive terminal of said current control signal source to said first transistor base, a second transistor having emitter, collector and base electrodes, a first resistor and said second transistor emitter and collector connected in series between said current control signal source positive and negative terminals, a second resistor and a diode rectifier connected in series across the terminals of said current limit signal source, said second transistor base being connected to the junction of said second resistor and diode rectifier, the positive terminal of said current limit signal source being connected to the positive terminal of said control voltage source, whereby when the load voltage exceeds a predetermined maximum value current flows through said first transistor emitter and collector to raise said control voltage and to raise the potential on said first transistor base to cease current flow through said unidirectional conducting means and hence control said regulatable rectifier circuit in accordance with said load voltage rather than said current limit signal to decrease the output of said regulatable rectifier to a predetermined float value of load voltage.

29. A regulatable rectifier circuit, comprising, in combination, alternating voltage input means to said rectifier circuit, first and second D.C. output terminals for connection to a load, magnetic amplifier means connected in said rectifier circuit to variably control the voltage at said output terminals, a first transistor having, emitter, collector, and base electrodes, said emitter being connected to said second D.C. output terminal, said collector being connected in circuit to pass current to increase the impedance of said magnetic amplifier means and hence decrease the output voltage at said output terminals, a rheostat connected between said base and collector of said first transistor, a control voltage source with positive and negative terminals, means connecting said control voltage source negative terminal to said first D.C. output terminal, means connecting said control voltage source positive terminal to said first transistor collector, means connected in said rectifier circuit and developing a current control signal source and a current limit signal source each with positive and negative terminals, first unidirectional conducting means connected to conduct current from the positive terminal of said current control signal source to said first transistor base, a second transistor having emitter, collector and base electrodes, a first resistor and said second transistor emitter and collector connected in series between said current control signal source positive and negative terminals, a second resistor and a diode rectifier connected in series across the terminals of said current limit signal source, said second transistor base being connected to the junction of said second resistor and diode rectifier, the positive terminal of said current limit signal source being connected to the positive terminal of said control voltage source, whereby when the load current exceeds a predetermined maximum the current limit signal exceeds said control voltage and said diode rectifier conducts to raise the voltage on said second resistor to increase the impedance of said second transistor and hence to increase the voltage across said first resistor to cause current flow through said first unidirectional conducting means and hence to produce a voltage drop across said rheostat to increase the impedance of said first transistor to essentially stop current flow through said first transistor emitter from said second D.C. output terminal and hence to control said regulatable rectifier circuit in accordance with said current limit signal rather than said load voltage.

References Cited in the file of this patent
UNITED STATES PATENTS
2,914,720    Merkel _____ Nov. 24, 1959